United States Patent [19]

Brouard et al.

[11] 4,010,151
[45] Mar. 1, 1977

[54] WATER INSOLUBLE MONO AZO AND DISAZO DYES CONTAINING CINNAMONITRILE GROUP

[75] Inventors: Claude Marie Henri Emile Brouard, Sotteville les Rouen; Jean Marie Louis Leroy, St. Etienne du Rouvray; Jean-Pierre Henry Stiot, Saint Pierre les Elbeuf, all of France

[73] Assignee: Produits Chimiques Ugine Kuhlmann, St. Denis, France

[22] Filed: Apr. 8, 1974

[21] Appl. No.: 459,147

Related U.S. Application Data

[63] Continuation-in-part of Ser. No. 123,414, March 11, 1971, abandoned.

[30] Foreign Application Priority Data

Mar. 12, 1970 France .............................. 70.08829
Apr. 13, 1973 France .............................. 73.13392

[52] U.S. Cl. .................... 260/160; 106/288 Q; 106/308 Q; 260/152; 260/155; 260/164; 260/165; 260/163; 260/186; 260/191; 260/193; 260/196; 260/205; 260/206; 260/207; 260/207.1; 260/207.5; 260/208; 260/465 E; 260/465 G; 260/465 K

[51] Int. Cl.$^2$ ................ C09B 29/08; C09B 29/36; C09B 29/38; C09B 33/12

[58] Field of Search .......... 260/152, 155, 160, 163, 260/164, 162, 165, 174, 191, 186

[56] References Cited

UNITED STATES PATENTS 3,578,654  5/1971  Feure ............................. 260/186

*Primary Examiner*—Floyd D. Higel
*Attorney, Agent, or Firm*—Beveridge, DeGrandi

[57] ABSTRACT

Dyestuffs of the general formula:

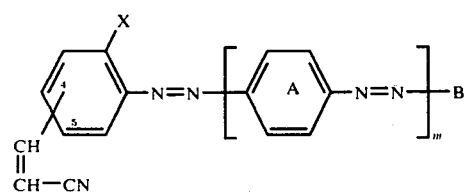

in which the radical —CH=CH—CN is fixed in the 4- or 5-position, X represents a hydrogen or chlorine atom, the benzene nucleus A is unsubstituted or substituted by at least one chlorine atom or alkyl, alkoxy or acylamino group, $m$ is the number 0 or 1, and B represents the residue of a coupling compound containing no sulphonic or carboxylic acid group.

The dyestuffs in which $m$ represents zero may be prepared by diazotizing a base of the formula:

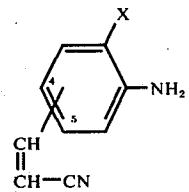

and coupling the diazo derivative with a coupling compound BH wherein X and B have the same significance as set out above.

The dyestuffs in which $m$ is equal to 1 may be prepared by coupling the diazo derivative of a base of the formula:

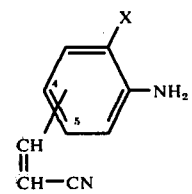

with an amine of the formula:

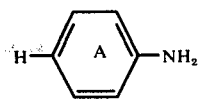

diazotizing the amino-monoazo dyestuff thus obtained and coupling with a coupling compound BH wherein

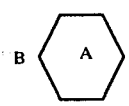

have the same significance as set out above.

The dyestuffs may be used for the coloration of synthetic fibres.

3-amino-cinnamonitrile or 3-amino-4-chloro-cinnamonitrile or 4-amino-3-chloro-cinnamonitrile. These may be prepared by Meerwein's reaction between acrylonitrile and a diazonium chloride of m- or p-nitraniline, dehydrohalogenation by means of an alkali and then reduction of the nitro group.

3 Claims, No Drawings

WATER INSOLUBLE MONO AZO AND DISAZO DYES CONTAINING CINNAMONITRILE GROUP

This application is a continuation-in-part of application Ser. No. 123,414 filed Mar. 11, 1971, and now abandoned.

The present invention relates to new water-insoluble azo dyestuffs which are of particular interest for the colouration of synthetic fibres, such as fibres based on cellulose diacetate, cellulose triacetate and, more particularly, aromatic polyesters and polyamides.

These new dyestuffs may be represented by the general formula:

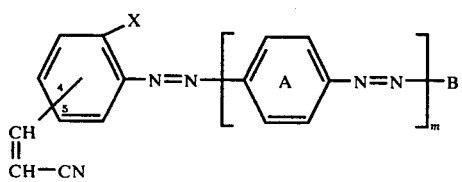

(I)

in which the radical —CH=CH—CN is fixed in the 4- or 5-position, X represents a hydrogen or chlorine atom, the benzene nucleus A may be substituted by one or more chlorine atoms or alkyl, alkoxy or acylamino groups, m is the number 0 or 1, and B represents the residue of a coupling compound, possibly substituted, but containing no sulphonic or carboxylic acid groups. The preferred alkyl and alkoxy groups are those containing 1 to 4 carbon atoms and the acyl groups may belong, for example, to the aliphatic, e.g. acetyl, aromatic, e.g. benzoyl, or araliphatic, e.g. cinnamoyl, series.

The coupling compounds of residue B may belong, to a wide variety of series, such as, for example, the benzene, naphthalene, quinoline, carbazole, diphenylene oxide, indazole, coumarin, acylacetarylide, pyrazolone, hydroxyquinoline or indole series. Specific examples of coupling compounds are:

1. the amines of the formula:

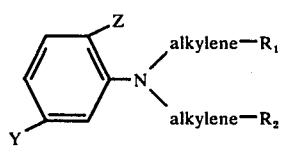

(II)

in which Y represents a hydrogen or chlorine atom or a methyl, methoxy or acylamino group, Z represents a hydrogen atom or a methyl or methoxy group, $R_1$ and $R_2$ may be the same or different and each may represent a hydrogen atom or a cyano, hydroxy, alkoxycarbonyl, acyloxy, acyl, alkylsulphonyl, carbonamido or alkoxycarbonyloxy group. The preferred alkyl, alkoxy and alkylene groups are those containing 1 to 4 carbon atoms and the acyl groups may belong, for example, to the aliphatic, e.g. acetyl, aromatic, e.g. benzoyl or araliphatic, e.g. cinnamoyl, series.

2. the pyrazolones of the formula:

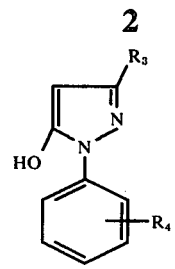

(III)

in which $R_3$ represents a hydrogen atom, a methyl or alkoxycarbonyl group or a carbonamide group which may be substituted by alkyl groups containing 1 to 4 carbon atoms and $R_4$ represents a hydrogen or chlorine atom or a cyano, nitro, methyl or sulphonamido group. The alkoxy group preferably contains 1 to 4 carbon atoms.

3. phenol and its homologs such as for example, p-cresol and the naphthols.
4. the N-alkyl-4-hydroxy-2-quinolones,
5. the hydroxycarbazoles,
6. the hydroxydiphenylene oxides, and
7. the indoles.

The dyestuffs of formula (I) in which m represents zero may be prepared, for example by diazotising a base of the general formula:

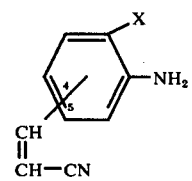

(IV)

and coupling the diazo derivative with a coupling compound BH, the significance of X and B being as defined above.

The dyestuffs of formula (I) in which m is equal to 1 may be prepared, for example, by coupling the diazo derivative of a base of formula (IV) with an amine of formula:

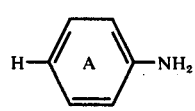

(V)

diazotising the amino-monoazo dyestuff thus obtained, and coupling with a coupling compound B — H, the significance of B and

being as defined above.

Dyestuffs having excellent properties are obtained, especially from the point of view of tinctorial yield, if the coupling compound BH is a pyrazolone of the general formula:

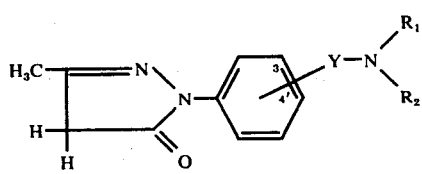

in which Y represents CO or SO$_2$, the group —Y—NR$_1$R$_2$ is fixed in the 3' or 4' position, R$_1$ represents an alkyl group containing 1 to 4 carbon atoms, and R$_2$ represents a hydrogen atom or an alkyl group containing 1 to 4 carbon atoms giving rise to dyestuffs of the general formula:

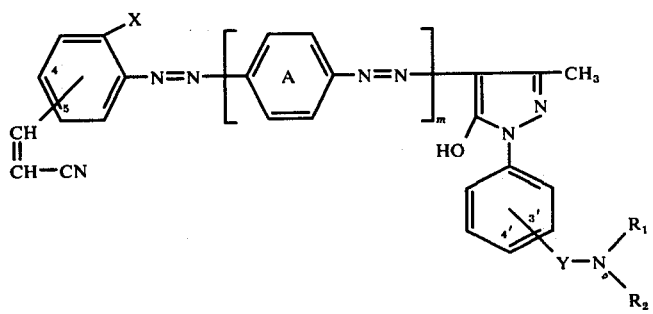

the position of the residue —CH=CH—CN, the significance of X and m and the possible substituents of the nucleus A being as defined for formula (I), and the position of the group —Y—NR$_1$R$_2$ and the significance of Y, R$_1$ and R$_2$ being as defined for formula (VI).

The colorations obtained on polyester fibres with dyestuffs of formula (VII) have an excellent fastness to sublimation, a good fastness to light and an excellent tinctorial yield.

The bases of formula (IV), with the exception of p-aminocinnamonitrile, are new products. They may be prepared, for example, by Meerwein's reaction between acrylonitrile and a diazonium chloride from m- or p-nitraniline, dehydrohalogenation by means of an alkali such as, for example, sodium acetate, and finally reduction of the nitro group.

In view of their tinctorial applications, it is advantageous for the dyestuffs obtained to be in a finely divided state. For this reason, the dyestuffs according to the invention are preferably pre-dispersed and provided in the form of a paste or powder. This form may be obtained by mixing the dyestuff in paste form with a dispersing agent, and possibly with an inert diluent. If desired the mixing may be followed by drying and grinding. The dyestuffs thus treated can then be used, for example, for dyeing in a long or short bath, in foularding or in printing. Examples of dispersing agents which may be used are the products resulting from the condensation of naphthalenesulphonic acids with formaldehyde, especially the dinaphthymethane disulphonates, esters of sulphonated succinic acid, alkali metal salts of sulphuric esters of fatty alcohols, for example, sodium lauryl-sulphate, ligno-sulphonates, soaps, alkali metal salts of the sulphuric esters of monoglycerides of fatty acids or the products obtained by the condensation of the cresols with formaldehyde and naphthol sulphonic acids, and the condensation products of 4,4'-dihydroxy-diphenylsulphone with formaldehyde and alkali metal bisulphites.

The dyeing of polyester fibres may be carried out, for example, in the presence of a carrier at a temperature from 80° C. to 125° C. inclusive or without a carrier under pressure at a temperature from 100° C. and 140° C. inclusive.

The fibres can also be foularded or printed with aqueous dispersions of the new dyestuffs, the impregnation obtained being then fixed at a temperature from between 140° C. to 230° C. inclusive for example by means of steam, air or by contact with a heated surface. The range of temperature from 180° C. to 200° C. inclusive is particularly favourable, since the dyestuffs diffuse rapidly into the polyester fibres and do not sublime even if the action of these high temperatures is prolonged. This enables fouling of the dyeing apparatus to be avoided.

Cellulose diacetate is preferably dyed by exhaustion at a temperature from 65° C. to 85° C. inclusive and cellulose triacetate and polyamide fibres are preferably dyed at a temperature up to 115° C. The most favourable pH region is between 2 and 9 inclusive and especially between 4 and 8 inclusive. Like the polyester fibres, the triacetate and polyamide fibres can be foularded or printed with an aqueous suspension of the new dyestuffs with subsequent fixing of the impregnations obtained at a temperature from 140° C. to 210° C. inclusive.

During foularding or printing the usual thickeners may be used, for example, modified or unmodified natural products, such as alginates, crystalline gum, carob, gum tragacanth, carboxymethyl-cellulose, hydroxyethylcellulose, starch, or synthetic products such as polyacrylic amides or polyvinyl alcohols.

The shades thus obtained are remarkably fast to thermal fixation, sublimation, creasing, combustion gases, overdyeing, dry cleaning, chlorine and wet tests, for example water, washing and sweat. The reserve of the natural fibres, especially of wool and cotton, and the dischargeability are good. The fastness to light is remarkable even with light shades, so that the new dyestuffs are very suitable for the production of fashion shades. The dyestuffs resist boiling and reduction at temperatures from 80° C. to 220° C. inclusive. This stability is not altered by the bath ratio nor by the presence of dyeing accelerators.

Certain dyestuffs of formula (I) can be used for the bulk colouration of varnishes, oils, synthetic resins and synthetic fibres spun from their solutions in organic solvents.

The invention is illustrated by, but not limited to, the following Examples, in which the parts are parts by weight unless the contrary is indicated.

EXAMPLE 1

140 parts of p-aminocinnamonitrile are dissolved in 1000 parts of water and 220 parts by volume of 30% hydrochloric acid and are diazotised by adding 70 parts of sodium nitrite. The solution of the diazo derivative is introduced into a solution of 231 parts of 1-phenyl-3-ethoxycarbonyl-5-pyrazolone in 2000 parts of water containing 120 parts of sodium carbonate. The dyestuff obtained is filtered off and mixed with a dispersing agent. It dyes polyester fibres an orange yellow shade possessing excellent fastness to light and to sublimation and indeed to the conditions set out above.

The p-aminocinnamonitrile, used in this Example, may be prepared as follows:

A mixture of 120 parts of acrylonitrile and 1000 parts of acetone is introduced into the solution of the diazo derivative obtained from 276 parts of p-nitroaniline. Then, 40 parts of cupric chloride crystallised with 2 molecules of water are added and the mixture is stirred vigorously. The evolution of nitrogen is exothermic and the temperature should be kept at 30°–32° C. by means of a cooling bath. When the diazonium chloride has disappeared (6 hours), yellow leaflets melting at 108° C. are filtered off. After recrystallisation from methanol, one obtains 330 parts of 2-chloro-3-(4-nitrophenyl) propionitrile which melts at 112° C. This product is then dehydrohalogenated by means of 200 parts of crystallised sodium acetate in a mixture of 340 parts of water and 800 parts of ethyl alcohol. The mixture is refluxed for 12 hours and 225 parts of 4-nitrocinnamonitrile are isolated in the cold. Melting point: 202° C. The 4-nitrocinnamonitrile thus obained is then reduced by the Bechamp method in 2000 parts of water and 800 parts of ethyl alcohol. The 4-aminocinnamonitrile is obtained which melts at 109°–110° C. Yield: 76%.

| Analysis | C% | H% | N% |
|---|---|---|---|
| Calculated $C_9H_8N_2$ | 75.00 | 5.55 | 19.44 |
| Found | 75.02 | 5.77 | 19.25 |

EXAMPLE 2

140 parts of m-aminocinnamonitrile are dissolved in 1000 parts of water and 220 parts by volume of 30% hydrochloric acid and are diazotised by adding 70 parts of sodium nitrite. Then, a solution of 232 parts of N-cyanoethyl-N-acetyloxyethyl-m-toluidine in 200 parts of acetic acid is added and the dyestuff obtained is filtered off and dispersed. It dyes polyester fibres a yellow shade possessing excellent fastness to light and to sublimation and indeed to the conditions set out above.

The m-aminocinnamonitrile used in this Example may be prepared according to the process described in Example 1 for the preparation of p-aminocinnamonitrile, but replacing p-nitroaniline by m-nitroaniline. One obtains successively:

The 2-chloro-3-(3-nitrophenyl) propionitrile which melts at 90° C. Yield: 60% the 3-nitrocinnamonitrile which melts at 160° C. Yield: 85% the 3-aminocinnamonitrile which melts at 84° C. Yield: 86%

| Analysis | C% | H% | N% |
|---|---|---|---|
| Calculated for $C_9H_8N_2$ | 75.00 | 5.55 | 19.44 |
| Found | 74.68 | 5.48 | 19.44 |

EXAMPLE 3

174.5 parts of 4-amino-3-chlorocinnamonitrile are stirred for 2 hours in 220 parts of 30% hydrochloric acid and 220 parts of water. 560 parts of water are added and the mixture is diazotised with 70 parts of sodium nitrite. Then, a solution of 281 parts of N-ethyl-N-cinnamoyloxyethyl-m-toluidine in 300 parts of acetic acid is introduced gradually. The dyestuff is filtered off and dispersed. It dyes polyester fibres an orange shade possessing excellent fastness to light and to sublimation and indeed to the conditions set out above.

The 4-amino-3-chlorocinnamonitrile used in this Example may be prepared according to the process described in Example 1 for the preparation of p-aminocinnamonitrile, but replacing p-nitroaniline by 3-chloro-4-nitroaniline. One obtains successively:

the 3-(4-nitro-3-chlorophenyl)-2-chloropropionitrile which melts at 120° C. Yield: 70% the 3-chloro-4-nitrocinnamonitrile which melts at 106°–107° C. Yield: 72% the 4-amino-3-chlorocinnamonitrile which melts at 135°–136° C. Yield: 82%

| Analysis | C% | H% | N% | Cl% |
|---|---|---|---|---|
| Calculated for $C_9H_7ClN_2$ | 60.50 | 3.92 | 15.68 | 19.89 |
| Found | 60.47 | 3.91 | 15.52 | 19.78 |

EXAMPLE 4

174.5 parts of 3-amino-4-chlorocinnamonitrile are stirred for 2 hours in 220 parts of 30% hydrochloric acid and 220 parts of water. 560 parts of water are added and the mixture is diazotised with 70 parts of sodium nitrite. Then, the solution of the diazo derivative is introduced into a solution of 238 parts of N,N-bis (2-hydroxyethyl)-N-acetyl-m-phenylenediamine in 500 parts of water. The dyestuff is isolated, dried and acetylated in 1000 parts of acetic anhydride. The greater part of the acetic anhydride is driven off and 300 parts of ethyl alcohol and 1000 parts of water are added. The dyestuff is isolated and dispersed. It dyes polyester fibres an orange yellow shade possessing excellent fastness to light and to sublimation and indeed to the conditions set out above.

The 3-amino-4-chlorocinnamonitrile used in this Example may be prepared according to the process described in Example 1 for the preparation of p-aminocinnamonitrile, but replacing p-nitroaniline by 4-chloro-3-nitroaniline. One obtains successively:

the 3-(3-nitro-4-chlorophenyl)-2-chloropropionitrile which melts at 78°–79° C. Yield: 65% the 4-chloro-3-nitrocinnamonitrile which melts at 134°–135° C. Yield: 78%

The 3-amino-4-chlorocinnamonitrile which melts at 130–131° C. Yield: 81%

| Analysis | C% | H% | N% | Cl% |
|---|---|---|---|---|
| Calculated for $C_9H_7ClN_2$ | 60.50 | 3.92 | 15.68 | 19.89 |
| Found | 60.31 | 3.99 | 15.47 | 19.78 |

The following Table gives other Examples of dyestuffs according to the invention of the formula:

Table (I)

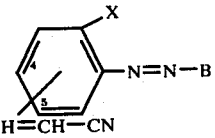
(VIII)

| Example | X | Position of the radical —CH=CH—CN | Coupling compound B—H | Shade on polyester fibres |
|---|---|---|---|---|
| 5 | H | 4 | 1-phenyl-3-methyl-5-pyrazolone | yellow |
| 6 | H | 5 | " | green-yellow |
| 7 | Cl | 4 | " | yellow |
| 8 | Cl | 5 | " | green-yellow |
| 9 | H | 4 | 2'-chloro-1-phenyl-3 methyl-5-pyrazolone | yellow |
| 10 | Cl | 5 | " | green-yellow |
| 11 | H | 4 | 3'-sulphonamido-1-phenyl-3-methyl-5-pyrazolone | green-yellow |
| 12 | Cl | 4 | 1-phenyl-3-carbonamido-5-pyrazolone | orange-yellow |
| 13 | Cl | 4 | N-methyl-4-hydroxy-2-quinolone | yellow |
| 14 | H | 4 | N-ethyl-N-cyanoethyl-aniline | orange |
| 15 | H | 5 | " | orange |
| 16 | Cl | 4 | " | orange |
| 17 | Cl | 5 | " | orange |
| 18 | H | 4 | N-hydroxyethyl-N-cyano-ethyl-aniline | orange |
| 19 | H | 4 | N-cyanoethyl-N-acetyloxy-ethyl-aniline | orange |
| 20 | H | 5 | " | orange |
| 21 | Cl | 4 | " | orange |
| 22 | Cl | 5 | " | orange |
| 23 | H | 4 | ethyl ester of N-ethyl-N-phenyl-amino-propionic acid | orange |
| 24 | H | 4 | N,N-dimethyl-N'-acetyl-m-phenylenediamine | scarlet |
| 25 | H | 5 | " | orange |
| 26 | Cl | 4 | " | scarlet |
| 27 | H | 4 | 3'-cyano-1-phenyl-3-methyl-5-pyrazolone | green-yellow |
| 28 | Cl | 5 | N,N-dimethyl-N'-acetyl-m-phenylenediamine | orange |
| 29 | H | 4 | N-ethyl-N-acetyloxyethyl-m-toluidine | scarlet |
| 30 | H | 5 | N-methyl-N-cinnamoyloxy-ethyl-aniline | yellow |
| 31 | Cl | 4 | N-methyl-N-cinnamoyloxy-ethyl-m-toluidine | scarlet |
| 32 | Cl | 5 | N,N-di(acetyloxyethyl) aniline | orange |
| 33 | H | 4 | N,N-di(acetyloxyethyl)-N'-acetyl-m-phenylene-diamine | orange |
| 34 | H | 5 | " | orange |
| 35 | Cl | 4 | " | orange |
| 36 | Cl | 5 | " | orange |
| 37 | H | 4 | N-ethyl-N-(2-carbonamido-ethyl) aniline | orange |
| 38 | H | 4 | N-ethyl-N-(2-methylsulpho-nyl-ethyl)aniline | orange |
| 39 | H | 4 | p-cresol | orange |
| 40 | H | 5 | " | yellow |
| 41 | Cl | 4 | " | orange |
| 42 | Cl | 5 | " | yellow |
| 43 | H | 4 | β-naphthol | scarlet |
| 44 | H | 4 | 3-acetylaminophenol | yellow |
| 45 | H | 5 | " | yellow |
| 46 | H | 4 | 1,1-dioxide of N-phenyl-1,4-tetrahydrothiazine | yellow |
| 47 | H | 5 | " | green-yellow |
| 48 | H | 4 | 1-N,N-di(acetyloxyethyl) amino-2-methoxy-5-acetylamino-benzene | scarlet |
| 49 | H | 4 | 3-hydroxy-diphenylene-oxide | brown-orange |
| 50 | H | 5 | 3-hydroxy-diphenylene-oxide | orange |

Table (I)-continued (VIII)

structure: benzene ring with X substituent, CH=CH—CN group, and —N=N—B group

| Example | X | Position of the radical —CH=CH—CN | Coupling compound B—H | Shade on polyester fibres |
|---------|---|---|---|---|
| 51 | Cl | 4 | 2-hydroxy-carbazole | brown-orange |
| 52 | Cl | 5 | 2-hydroxycarbazole | yellow |
| 53 | H | 4 | 7-hydroxycoumarine | yellow |
| 54 | H | 5 | " | green-yellow |
| 55 | Cl | 4 | 7-hydroxyindazole | orange |
| 56 | Cl | 5 | " | yellow |

EXAMPLE 57

140 parts of p-aminocinnamonitrile are dissolved in 1000 parts of water and 200 parts by volume of 30% hydrochloric acid and are diazotised by adding 70 parts of sodium nitrite. The solution of the diazo derivative is introduced rapidly into a solution of 123 parts of m-anisidine in 2500 parts of water and 105 parts of 30% hydrochloric acid. 2400 parts of an aqueous 20% solution of sodium acetate are added within one hour and a half, the mixture is filtered and the paste is mixed with 2500 parts of water. 400 parts of 30% hydrochloric acid are added and the amino-azo compound is diazotised with 70 parts of sodium nitrite. The solution thus obtained is introduced slowly into 232 parts of 1-phenyl-3-carbonamido-5-pyrazolone dissolved in 4000 parts of water with 40 parts of sodium hydroxide and 400 parts of calcined sodium carbonate. The dyestuff obtained, previously dispersed, dyes polyester fibres a scarlet shade possessing excellent fastness to light and to sublimation and indeed to the conditions set out above.

The following Table gives other Examples of dyestuffs according to the invention of the formula:

EXAMPLE 64

A fabric of ethylene glycol polyterephthalate is impregnated by foularding with a bath which contains 9 parts of the dyestuff obtained in Example 5, 0.5 parts of a polyglycol ether of oleyl alcohol, 1.5 parts of a polyacrylic amide and the amount of water necessary to make up to 1000 parts. After drying, the fabric is subjected to thermal fixation for 1 minute at 200° C. and then to a reducing treatment by sodium dithionite. A yellow shade is obtained.

EXAMPLE 65

7.2 parts of para-amino-cinnamonitrile are dissolved in 100 parts of water and 14 parts by volume of 30% hydrochloric acid and are diazotised by adding 3.5 parts of sodium nitrite dissolved in 3.5 parts of water. The excess nitrous acid is eliminated by the addition of sulphamic acid, then the solution of the diazo derivative is introduced into a solution of 14 parts of 1-(3'-N,N-diethylcarbonamido-phenyl)-3-methyl-5-pyrazolone dissolved in 100 parts of water, 6 parts by volume of a solution of 35° Be sodium hydroxide and 6 parts of sodium carbonate. The dyestuff obtained is filtered off, Table II (IX)

| Example | X | Position of the radical —CH=CH—CN | Y | B | Shade |
|---------|---|---|---|---|---|
| 58 | H | 4 | OCH₃ | 2-methyl-4-(N-ethyl-N-cyanoethylamino)-phenyl | bordeaux |
| 59 | H | 5 | CH₃ | 2-acetylamino-4-dimethyl-aminophenyl | violet |
| 60 | Cl | 4 | NHCOCH₃ | 1-phenyl-3-ethoxycarbonyl-5-oxopyrazol-4-yl | scarlet |
| 61 | H | 4 | CH₃ | 2-phenylindol-3-yl | scarlet |
| 62 | H | 4 | OCH₃ | " | red |

EXAMPLE 63

A fabric of ethyleneglycol polyterephthalate is printed with a printing paste which contains 20 parts of the dyestuff described in Example 4, 150 parts of the sodium salt of a sulphonated castor oil, 600 parts of a thickener and 250 parts of water. After drying, the fabric is subjected to thermal fixation for 1 minute at 200° C. and then to a reducing treatment. An orange yellow shade having good general fastness is obtained.

washed and kneaded with a dispersing agent. It dyes polyester fibres a full-bodied yellow shade, with excellent general fastness.

EXAMPLE 66

8.9 parts of 4-amino-3-chloro-cinnamonitrile in 25 parts of water and 25 parts by volume of 30% hydrochloric acid are mixed for an hour and diazotised by adding 3.5 parts of sodium nitrite dissolved in 3.5 parts of water. The excess of nitrous acid is destroyed by the addition of sulphamic acid, the product is filtered and the filtrate is run into a solution of 14.2 parts of 1-(3'-N,N-dimethylsulphonamido-phenyl)-3-methyl-5-pyrazolone in 100 parts of water, 6 parts by volume of a solution of 35° Be sodium hydroxide and 18 parts of sodium carbonate. The dyestuff obtained is filtered off, washed, and then dispersed, and dyes polyester fibres a golden yellow shade of excellent general fastness.

The following Table summarises other Examples of monoazo dyestuffs of general formula (VII) where $m = 0$.

dine, 200 parts of water and 6 parts by volume of 30% hydrochloric acid. 120 parts of a 20% aqueous solution of sodium acetate are added over a period of one and a half hours, the solid is filtered off and the paste is taken up in 200 parts of water. 40 parts by volume of 30% hydrochloric acid are added and diazotisation is effected by adding 3.5 parts of sodium nitrite dissolved in 3.5 parts of water. The solution thus obtained is slowly introduced into a solution of 14 parts of 1-(3'-N,N-diethylcarbonamido-phenyl)-3-methyl-5-pyrazolone in 100 parts of water, 6 parts by volume of a solution of

| Example | Diazotisable base of formula (IV) | Coupling compound of formula (VI) | Shades on polyester fibres |
|---|---|---|---|
| 67 | 3-amino-cinnamonitrile | 1-(4'-N,N-diethylsulphonamido phenyl)-3-methyl-5-pyrazolone | green-yellow |
| 68 | 4-amino-cinnamonitrile | " | " |
| 69 | " | 1-(3'-N,N-dibutylsulphonamido-phenyl)-3-methyl-5-pyrazolone | " |
| 70 | 3-amino-cinnamonitrile | " | " |
| 71 | 4-amino-3-chloro-cinnamonitrile | 1-(4'-N,N-diethylcarbonamido-phenyl)-3-methyl-5-pyrazolone | yellow |
| 72 | 3-amino-4-chloro-cinnamonitrile | " | " |
| 73 | " | 1-(4'-N,N-dibutylcarbonamido-phenyl)-3-methyl-5-pyrazolone | " |
| 74 | 4-amino-3-chloro-cinnamonitrile | " | " |
| 75 | 4-amino-cinnamonitrile | 1-(3'-N,N-dipropylcarbonamido-phenyl)-3-methyl-5-pyrazolone | " |

EXAMPLE 76

7.2 parts of p-amino-cinnamonitrile are dissolved in 100 parts of water and 14 parts by volume of 30% by volume hydrochloric acid and diazotised by adding 3.5 parts of sodium nitrite dissolved in 3.5 parts of water. The excess of nitrous acid is eliminated by the addition of sulphamic acid, then the solution of the diazo derivative is introduced into a mixture of 6.2 parts of m-tolui- 35° Be sodium hydroxide and 25 parts of sodium carbonate. The dyestuff obtained, when dispersed, dyes polyester fibres an orange shade of good general fastness.

The following Table summarises other Examples of disazo dyestuffs of general formula (VII) where $m = 1$.

| Example | Base of formula (II) | Amine of formula (V) | Coupling compound of formula (VI) | Shade on poly- on polyfibres |
|---|---|---|---|---|
| 77 | 3-amino-cinnamonitrile | m-toluidine | 1-(3'-N,N-dimethyl sulphonamido-phenyl)-3-methyl-5-pyrazolone | orange |
| 78 | 4-amino-3-chloro-cinnamonitrile | N-acetyl-m-phenylene-diamine | 1-(4'-N,N-dipropyl-sulphonamido-phenyl)-3-methyl-5-pyrazolone | scarlet |
| 79 | 3-amino-4-chloro-cinnamonitrile | N-propanoyl meta-phenylene diamine | 1-(3'-N,N-dimethyl-carbonamido-phenyl)-3-methyl-5-pyrazolone | scarlet |
| 80 | 4-amino-cinnamonitrile | N-benzoyl meta-phenylene diamine | " | " |
| 81 | 4-amino-cinnamonitrile | 3-ethyl-aniline | 1-(3'-N,N-dimethyl-carbonamido-phenyl) 3-methyl-5-pyrazolone | orange |
| 82 | " | 2-methoxy-aniline | " | scarlet |
| 83 | 4-amino-cinnamonitrile | 2-ethoxy-aniline | 1-(3'-N,N-dimethyl-carbonamido-phenyl)-3-methyl-5-pyrazolone | scarlet |
| 84 | 4-amino-3-chloro-cinnamonitrile | 3-chloro-aniline | " | orange |

EXAMPLE 85

A fabric of ethyleneglycol polyterephthalate fibres is printed with a printing paste comprising 10 parts of the dyestuff described in Example 65, 75 parts of sodium salt of sulphonated castor oil, 300 parts of a thickener and 125 parts of water. After drying, the fabric is heat-fixed for one minute at 200° C. then subjected to a reducing treatment. A yellow shade of excellent general fastness is obtained.

Compounds which are analogous to those of the present application are described in U.S. Pat. No. 3,578,654 (Favre). The compounds of the present application which have a cinnamonitrile radical are, however, unexpectedly superior to those of Favre which have a 2-hydroxy-5-cyanoethylphenyl or 2-hydroxy-3-methyl-5-cyanoethylphenyl radical in respect of tinctorial yield, fastness to sublimation and light and reserve to wool. This is shown in tests described below. in a first series of tests the following dyestuffs were compared.

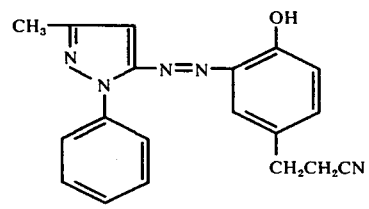

(A₁)

included in claim 1 of Favre

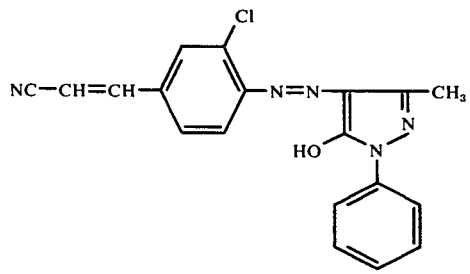

(B₁)

Example 7 of the present application

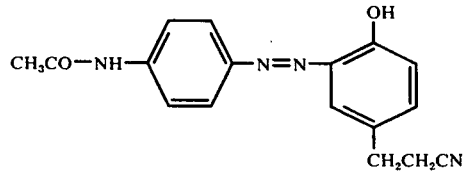

(A₂)

column 7 of Favre, at the top

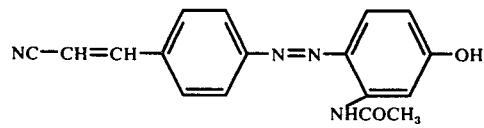

(B₂)

Example 44 of the present application.

The tests to which these dyestuffs were submitted are as follow.

Test No. 1

The dyestuffs A₁ and B₁ were applied to polyester fibre fabric ("Tergal") of the rate of 0.3%, 0.6%, and 0.9% in accordance with the following process.

A dyebath was prepared with 0.3 (or 0.6 or 0.9) parts of the previously dispersed dyestuff, 2000 parts of water at 75° C. and a quantity of acetic acid sufficient to make the pH4. After the fabric (100 parts) had been inserted in the dyebath, the temperature was raised to 130° C. under pressure and this temperature was maintained for one hour. The fabric was then rinsed and dried.

On examining samples of the fabrics which have been dyed in this manner it can be seen that the colourations obtained with dyestuff B₁ of the present application are much stronger than those obtained with dyestuff A₁ of Favre. In addition, it can be seen that 0.9% of dyestuff A₁ is needed to obtain a shade having an intensity which is close to that obtained with only 0.3% of dyestuff B₁ of the present application. The tinctorial yield of B₁ is therefore approximately 3 times greater than that of A₁.

TEST NO. 2

The fastness to sublimation of fabrics dyed in accordance with the process of Test No. 1 with dyestuffs A₁ and B₁ with a close intensity of colour (namely 0.9% of dyestuff A₁ and 0.3% of dyestuff B₁) is tested with the Thermotest Rhodiaceta apparatus described in Teintex, 1957 (15th May), page 343, and approved by the Textile Institute of France.

In this apparatus there are 13 small electrically heated plates which rest on unheated plates, the former being fixed side by side on a flap and the latter side by side on a bed. The plates on the flap were heated to various verified temperatures. The dyed samples of polyester fibres were then placed between two strips of fabric, one of cotton and the other of polyester. The samples thus disposed were stretched over the unheated plates with the strip of polyester fabric on top.

On examining the sample of fabric it can be seen that the test fabric is stained a lot more with dyestuff $A_1$ than with dyestuff $B_1$. At 154° C. the test fabric is already stained with dyestuff $A_1$; it is not stained with dyestuff $B_1$ because a temperature of 188° C. must be reached for an equivalent discharge. Dyestuff $B_1$ of the present application is thus much more fast to sublimation than dyestuff $A_1$ of A.

Test No. 3

Polyester fabrics were dyed with 0.9% of dyestuffs $A_2$ and $B_2$ in accordance with the process described in Test No. 1, then subjected to the sublimation test described in Test No. 2.

On examining the samples of fabric it can be seen that at 163° C. the test fabric is heavily stained with dyestuff $A_2$; a temperature of 182° C. must be reached before there is an equivalent discharge with dyestuff $B_2$.

In a second series of tests the following dyestuffs were compared.

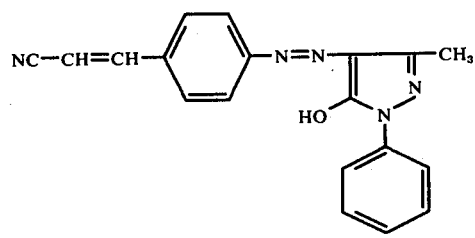

(Example 5 of the present application)

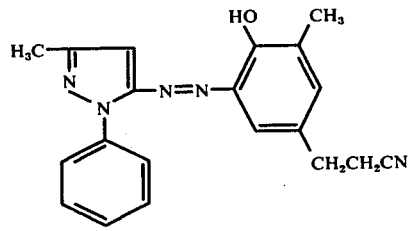

(Example 139 of Favre)

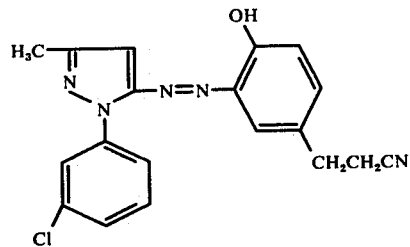

(Example 153 of Favre)

The tests to which these dyestuffs were submitted are as follows.

TEST NO. 4

The dyestuffs $A_3$, $A_4$ and $B_3$ were applied to polyester fibre fabric (Tergal) at the rate of 0.9% in accordance with the following process:

A dyebath was prepared with 0.9 part of the previously dispersed dyestuff, 2000 parts of water at 75° C. and a quantity of acetic acid sufficient to make pH 4. After the fabric (100 parts) had been inserted in the dyebath, the temperature was raised to 130° C. under pressure and this temperature was maintained for one hour. The fabric was then rinsed and dried.

Thereafter, samples of the so dyed fabrics were exposed simultaneously for 20, 40, and 120 hours to artificial light (Xenotest).

On examining the samples of fabrics it can be seen that the shades obtained with the dyestuffs $A_3$ and $A_4$ of Favre faded greatly after only 20 hours exposure to light, whereas the shade obtained with Applicants' dyestuff $B_3$ remains practically unchanged after 120 hours exposure.

Applicants' dyestuff $B_3$ is therefore distinctly superior to Favre's dyestuffs $A_3$ and $A_4$ in relation to fastness to light.

TEST NO. 5

The reserve of dyestuffs $A_3$, $A_4$ and $B_3$ to cotton was tested by operating as follows.

100 parts of polyester fibre fabric (Tergal) and 10 parts of cotton fibres were inserted in a dyebath prepared with 0.9 parts of the previously dispersed dyestuff, 2000 parts of water at 75° C. and a quantity of acetic acid sufficient to make pH 4. Thereafter, the temperature was raised to 130° C. under pressure and this temperature was maintained for one hour. The polyester fabric and the cotton fibres were then rinsed and dried.

On examining the samples of the polyester fabrics and of the cotton fibres which have been treated in this manner it can be seen that the cotton fibres are coloured a pale yellow whatever the dyestuff is. Dyestuffs $A_3$, $A_4$ and $B_3$ reserve equally cotton fibres.

It can be seen also that the colouration obtained with Applicants' dyestuff $B_3$ is much stronger than those obtained with Favre's dyestuffs $A_3$ and $A_4$. For the same quantity of dyestuff, the tinctorial yield of $B_3$ is considerably superior to that of $A_3$ or $A_4$.

TEST NO. 6

The reserve of dyestuffs $A_3$, $A_4$ and $B_3$ to wool was tested by operating as follows.

100 parts of polyester fibre fabric Tergal and 10 parts of wool yarn were introduced in a dyebath prepared with 0.9 parts of the previously dispersed dyestuff, 2000 parts of water at 75° C. 5 parts of an emulsion of di- and trichlorobenzene, and a quantity of acetic acid sufficient to make pH 4. Thereafter, the temperature was raised to 100° C. and this temperature was maintained for one hour. The polyester fabric and the wool yarn were then rinsed and dried.

On examining samples of the polyester fabrics and wool yarns which have been treated in this manner it can be seen that the wool yarns are more strongly coloured with Favre's dyestuffs $A_3$ and $A_4$ than with Applicants' dyestuff $B_3$. The reserve of $B_3$ to wool is better than those of $A_3$ and $A_4$. Moreover, as previously stated in Test No. 5, the shade obtained at 100° C. with Applicants' dyestuff $B_3$ is more full-bodied than those obtained with Favre's dyestuffs $A_3$ and $A_4$.

We claim:
1. A dyestuff of the formula:

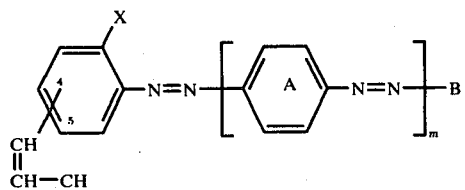

in which —CH=CH—CN is fixed in the 4- or 5- position, X is hydrogen or chlorine, $m$ is zero or one, the benzene nucleus A is unsubstituted or substituted by one chlorine, alkyl containing 1 to 4 carbon atoms, alkoxy containing 1 to 4 carbon atoms, acetylamino, propanoylamino, benzoylamino or cinnamoylamino, and B is selected from the group consisting of hydroxycarbazole, N-alkyl-4-hydroxy-2-quinolones with 1 to 4 carbon atoms in the alkyl group,

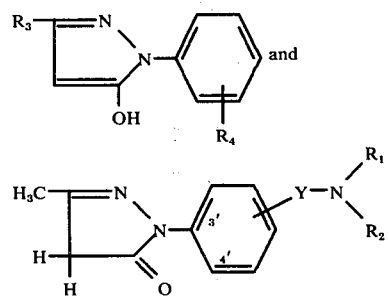

wherein Y is CO or $SO_2$, the group -Y-$NR_1R_2$ is fixed in the 3' or 4' position, $R_1$ is alkyl containing 1 to 4 carbon atoms, $R_2$ is hydrogen or alkyl containing 1 to 4 carbon atoms, $R_3$ is hydrogen, methyl, alkoxycarbonyl, carbonamide, N-alkyl-or N,N-dialkylcarbonamido, the alkyl and alkoxy groups containing 1 to 4 carbon atoms, and $R_4$ is hydrogen, chlorine, cyano, nitro, methyl or sulphonamido.

2. A dyestuff according to claim 1 of the formula:

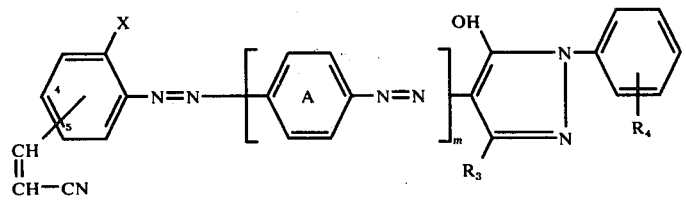

wherein X, A, $m$, $R_3$ and $R_4$ are as defined in claim 1.

3. A dyestuff according to claim 29 of the formula:

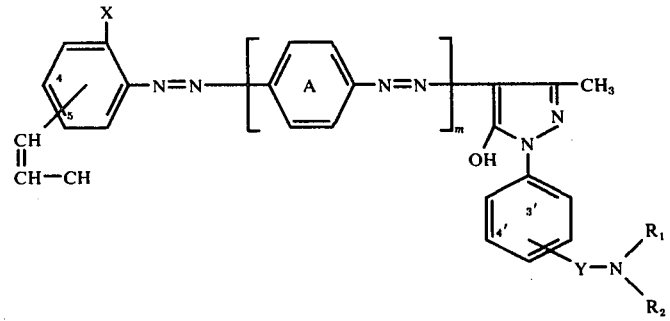

wherein X, A, $m$, Y, $R_1$ and $R_2$ are as defined in claim 1.

* * * * *

UNITED STATES PATENT OFFICE
CERTIFICATE OF CORRECTION

Patent No. 4,010,151      Dated March 1, 1977

Inventor(s) CLAUDE MARIE HENRI EMILE BROUARD ET AL

It is certified that error appears in the above-identified patent and that said Letters Patent are hereby corrected as shown below:

Page 1, item [63] should read

"Continuation-in-part of Serial No. 123,414, March 11, 1971 now U.S. Patent 4,008,213."

Column 1, lines 7-8 "now abandoned" should read:

-- now U.S. Patent No. 4,008,213 --.

Column 18, claim 3 should read:

"A dyestuff according to claim 1 of the formula:."

Signed and Sealed this

Twentieth Day of September 1977

[SEAL]

Attest:

RUTH C. MASON       LUTRELLE F. PARKER
*Attesting Officer*      *Acting Commissioner of Patents and Trademarks*